March 21, 1933. G. E. RANDLES 1,902,520
INDEXING MECHANISM FOR MACHINE TOOLS
Filed Aug. 20, 1928 6 Sheets-Sheet 1

FIG.-1

Inventor
George E. Randles
By Bates, Macklin, Golrick & Teare
Attorneys

March 21, 1933. G. E. RANDLES 1,902,520
INDEXING MECHANISM FOR MACHINE TOOLS
Filed Aug. 20, 1928 6 Sheets-Sheet 3

Inventor
George E. Randles
By Bates, Macklin, Golrick & Teare
Attorneys

March 21, 1933.　　　G. E. RANDLES　　　1,902,520
INDEXING MECHANISM FOR MACHINE TOOLS
Filed Aug. 20, 1928　　　6 Sheets-Sheet 4

Inventor
George E. Randles
By Bates Macklin Holnick & Peare
Attorney

March 21, 1933.  G. E. RANDLES  1,902,520
INDEXING MECHANISM FOR MACHINE TOOLS
Filed Aug. 20, 1928  6 Sheets-Sheet 5

Inventor
George E. Randles
By Bates, Macklin, Golrick & Teare
Attorneys

March 21, 1933.   G. E. RANDLES   1,902,520
INDEXING MECHANISM FOR MACHINE TOOLS
Filed Aug. 20, 1928   6 Sheets-Sheet 6

Inventor
George E. Randles
By Bates, Macklin, Golrick & Teare
Attorneys

Patented Mar. 21, 1933

1,902,520

UNITED STATES PATENT OFFICE

GEORGE E. RANDLES, OF CLEVELAND, OHIO, ASSIGNOR TO THE FOOTE-BURT COMPANY, OF CLEVELAND, OHIO, A CORPORATION OF OHIO

INDEXING MECHANISM FOR MACHINE TOOLS

Application filed August 20, 1928. Serial No. 300,834.

This invention is concerned with power operated metal cutting machine tools, and specifically to an indexing mechanism applicable to such tools.

The primary object is to provide an indexing mechanism which shall be simple, compact and very accurate in operation.

Another object of my invention is to provide an indexing mechanism in which the work table is moved away from the path of the tool, indexed, and then returned and accurately located with respect to the path of the tool.

A specific object is to provide an indexing mechanism for a rotary element, such as a work holder, wherein the indexing is effected automatically and rapidly by a simple reciprocating movement common to practically all machine tools.

A further object is to provide a mechanical movement applicable to indexing and like mechanisms, by the use of which considerable space and material may be saved, as compared to the present practice.

Further objects and features of the invention will become apparent from the following description relating to the accompanying drawings, wherein I show the preferred embodiment of my invention. The essential characteristics are summarized in the claims.

The drawings illustrate the present embodiment in connection with a drill press of a well known type, on which a rotary work table is adapted to be used. The work table is adapted to support a number of fixtures radially arranged to carry pieces on which the work is to be done, for example, castings to be drilled. The invention, as applied, causes such fixtures to be automatically and successively presented in proper relation to the drill.

It is to be understood that the invention may be employed in any analogous machine, for example, the work may be supported in a substantially fixed position, and various tools may be presented to the work by mounting such tools on the indexed element of the mechanism.

A drill press of the type shown has a reciprocating part, namely the spindle head, and cooperating mechanism for rotating the drill and causing it to advance relative to the work. I propose to use the reciprocating movement of such spindle head or like reciprocating part to effect the operation of the indexing mechanism hereof.

The more important elements and relationships in the indexing mechanism herein shown are as follows: A rotary work table is mounted on a carrier which reciprocates on a relatively fixed support. The table has a movement transverse to the reciprocating movement. The above combined movements index and accurately locate the table with respect to the tool. Connected with the reciprocating part of the drill press is a main cam bar which operates a second cam bar to raise the table, thereby releasing it for rotation. The main cam bar then operates to move the carrier on the support to cause a partial rotation of the table through a rack and pinion and connections including a modified Geneva motion mechanism to turn the table. Upon continued movement of the carrier, the table is lowered and accurately positioned, and upon completion of a full reciprocation of the main cam bar, the carrier is returned and locked in place. The operative connection between the main cam bar and the carrier comprises toggle links positioned between the carrier and the fixed support.

The modified Geneva motion is such that the usual Geneva motion disc need only be turned a small portion of a rotation to effect a much greater rotation of the work table, and because of the arrangement, the Geneva motion mechanism is made very compact and simple.

Referring to the drawings.

Figure 1:
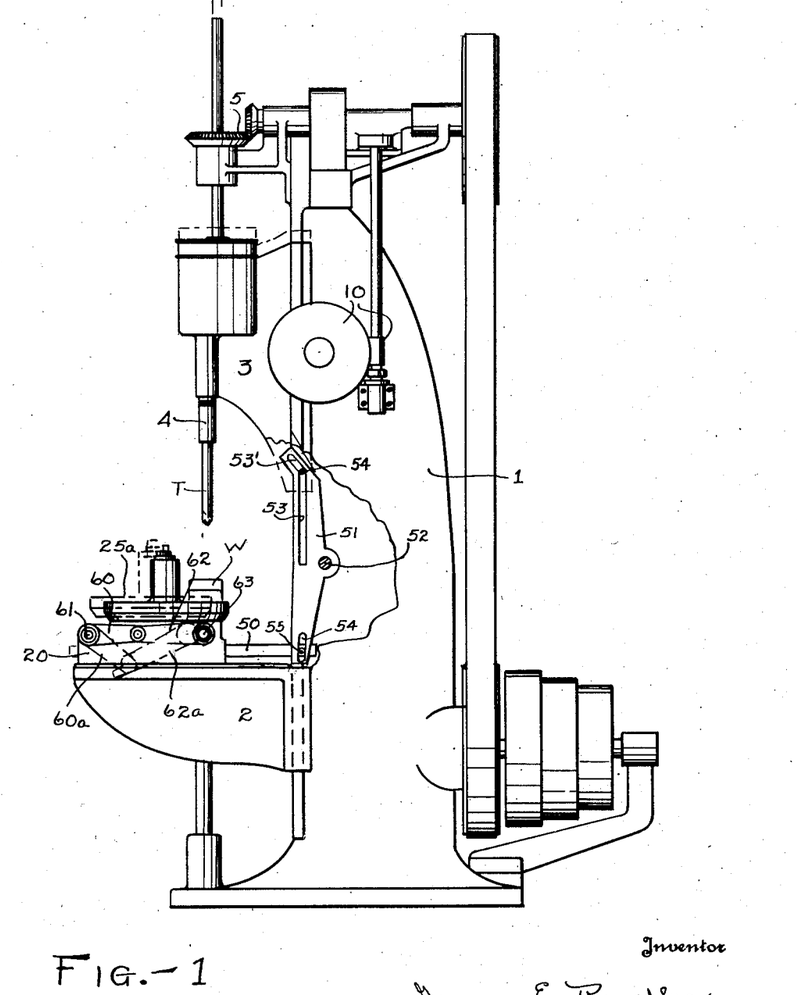
Fig. 1 shows a drill press equipped with an embodiment of my mechanism.

Referring in detail to the drawings, Fig. 1 shows a drill press of the upright type having a base or column 1, a raisable work support 2, spindle head 3, and spindle driving mechanism including a spindle 4. In this type of machine any suitable overhead driving gearing 5 serves to rotate the spindle. The gearing may be driven by the usual belt drive conventionally shown at the right hand side of Fig. 1. The spindle head may be suitably raised and lowered, to carry the tool, such as a drill T into cutting relation to the work, as by power feed mechanism, indicated conventionally at 10.

The invention, as embodied, comprises a base 20 adapted to be secured in any convenient manner, as by bolts, to the work support 2 of the press. The base has formed on its upperside a dovetail groove 21 for a correspondingly shaped tongue 23 of a carrier 22. As shown, the tongue and groove permit the frame 22 to reciprocate from and toward the machine column, from right to left, as veiwed in Fig. 1. On top of the carrier 22 is a work supporting table 25 arranged to turn on the carrier, the table having a downwardly extending circular flange 26 formed to slidably fit the top of the carrier as a guide and chip guard. The top of the table may be suitably arranged to support a plurality of jigs for work W, as by means of the usual T slots 27.

The table 25 (see Fig. 4) is arranged to rotate about a sleeve 30 extending vertically within a hub 31 of the table and secured to the carrier at the bottom of the tongue 23 as by screws, one being shown at 32. Slidably keyed, as at 33 (Fig. 5), within the sleeve 30 is a bar 35 carrying a roller 36 at its lower end. The roller coacts with a cam surface 41 on a cam bar 40, extending laterally into the carrier in suitable openings, to raise and lower the table.

Figure 4:
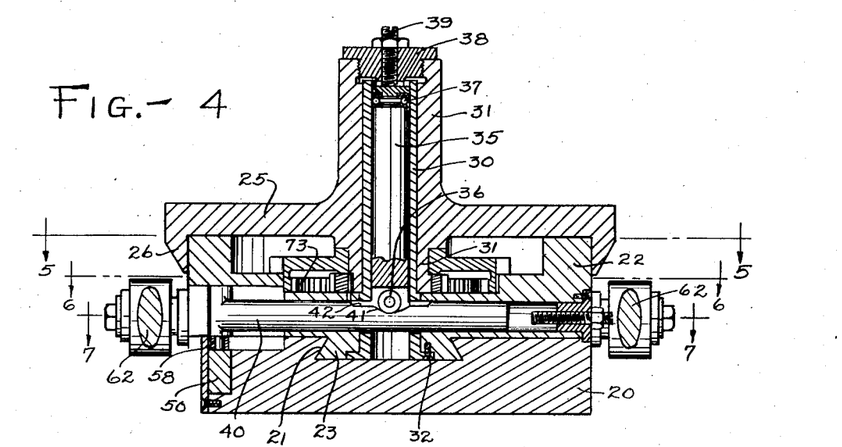
Fig. 4 is a substantially central cross sectional view as indicated by the line 4—4 on Fig. 2.

The table turns when raised, and therefore I provide an adjustable antifriction bearing 37 between the top of the bar 35 and the hub of the table, the hub having a threaded cap 38 and the cap being provided with an adjusting screw 39 engaging a portion of the bearing.

For actuating the bar 40 to raise and lower the bar 35, as well as to reciprocate the carrier, I show a main control or cam bar 50 (see Figs. 1, 3 and 7), adapted to be connected by suitable means, to the spindle head of the press.

The cam bar 50 may be suitably guided by the support 20 to pass alongside the carrier 22 and may be reciprocated by a lever 51 pivoted as at 52 to the column of the press. The upper end of the lever has a slot 53 which is vertical, except for its uppermost portion 53'. A pin or roller 54 on the spindle head is in constant engagement with the slot. The lower end of the lever has a slot 54 embracing a pin or roller 55 on the control bar 50. It will be seen that as the spindle head is raised to carry the tool from the work that the control bar 50 will be moved to the left (Fig. 1), when the spindle head approaches its uppermost position, and in the opposite direction when the spindle head returns. The indexing of the table is accomplished while the pin 54 is in the inclined portion 53' of the slot, and thereafter, the pin rides down the vertical portion of the slot without affecting the indexing mechanism.

Figure 7:
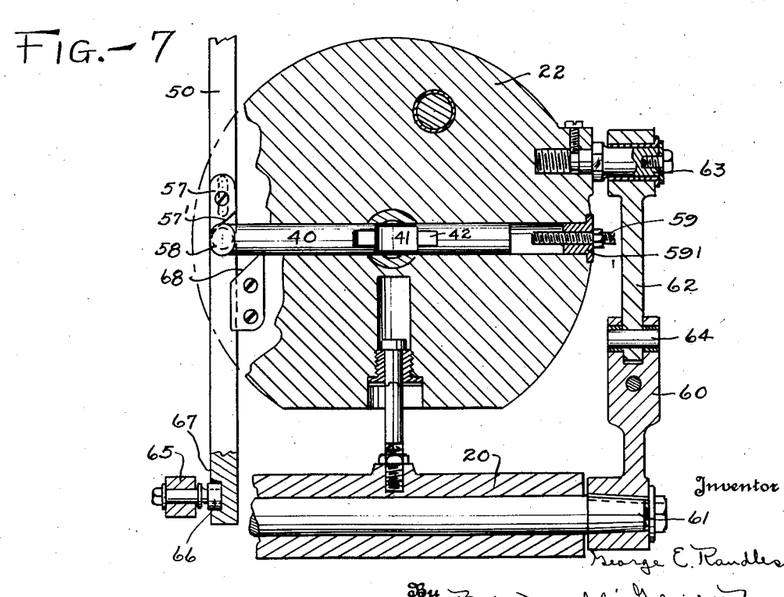

When the bar 50 is thrust forwardly, as just described, it causes the table raising bar 40 to be thrown to the right, as shown in Fig. 7, by reason of a block 57 rigidly carried on the bar 50, and having a cam face, 57', positioned to engage a roller 58 on the end of the bar 40. The bar 40 may be prevented from overthrowing by reason of an adjustable stop which may comprise a set screw 59 in a detachable plate 59', the screw being arranged with its inner end adjustably positioned to engage the end of the bar 40.

Figure 2:
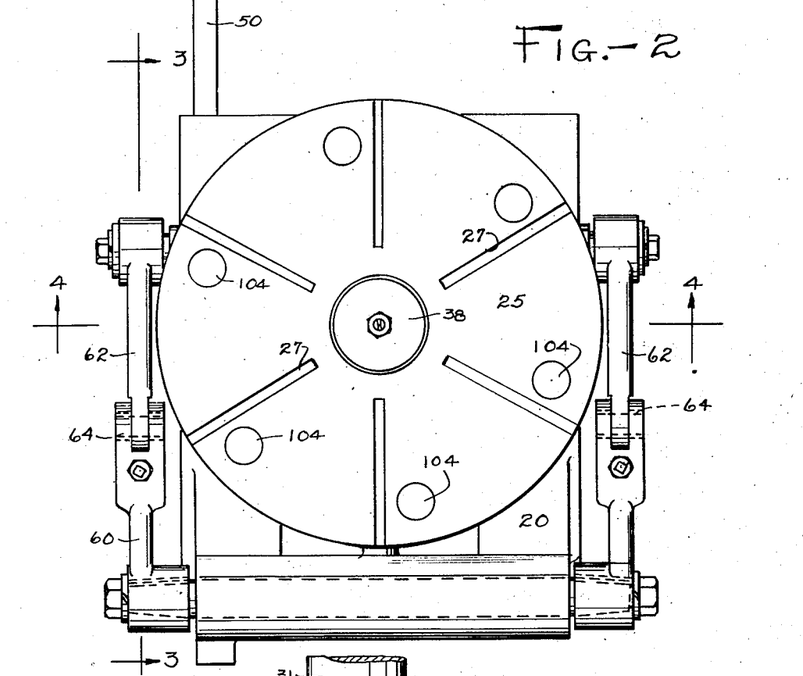
Fig. 2 is a plan view of such embodiment detached from the press.

As previously stated, the carrier 22 is arranged to reciprocate forwardly and rearwardly with reference to the work support 2 of the press. The control bar 50, above described, also effects this reciprocation, and the operating connections from the bar include pairs of toggle links, one pair being positioned at each side of the carrier 22 and table, as shown in Fig. 2. Each pair comprises a link 60 pivotally secured to the base 20, as at 61 and a link 62 similarly secured to the carrier 22, as at 63, the links being pivotally secured together as by pins 64. The toggle links are shown substantially aligned in Fig. 1, and in this position, the work on the rotary table 25 is positioned to receive the drill T.

As previously stated, the reciprocation of the carrier by the toggle arrangement is a controlling movement in indexing the table.

Figure 3:
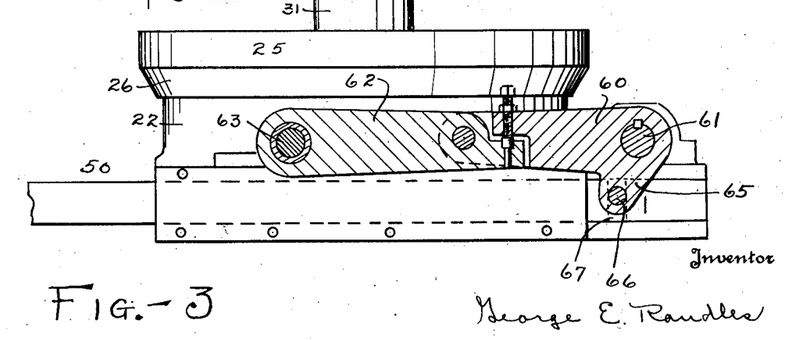
Fig. 3 is a sectional side elevation of the mechanism, as indicated by the line 3—3 on Fig. 2.

To break and reposition the toggles, I provide a depending arm 65 on one of the toggle links 60, as shown in Fig. 3. The arm carries a pin 66 which is engaged by a slot 67 in the bar 50. As the carrier 22 is projected forwardly under the action of the toggles, the roller 58 on the bar 40 finally engages a cam 68 fixed on the support 20 (see Figs. 4 and 7) which again lowers the table by allowing the roller 36 on the vertical bar 35 to ride off the surface 42 on the bar 40.

The connections whereby the table is indexed during the reciprocating movement of the carrier comprise a modified Geneva motion arrangement, including a slotted disc 70 loosely mounted on a downwardly projecting tubular extension 31 of the table 25. The disc is in constant driving relation to the table, by reason of an internal gear ring formed on the disc as at 73, a series of planetary gears 74 in fixed position on the carrier and a sun gear 75 which is rigidly fixed on the extension 32 of the table so as to raise and turn with it. The planetary gears are carried on suitable supporting pins 77 extending into the carrier 22 so that they do not revolve about the sun gear, but serve as idlers in communicating motion from the internal gear to the sun gear.

Figure 8:
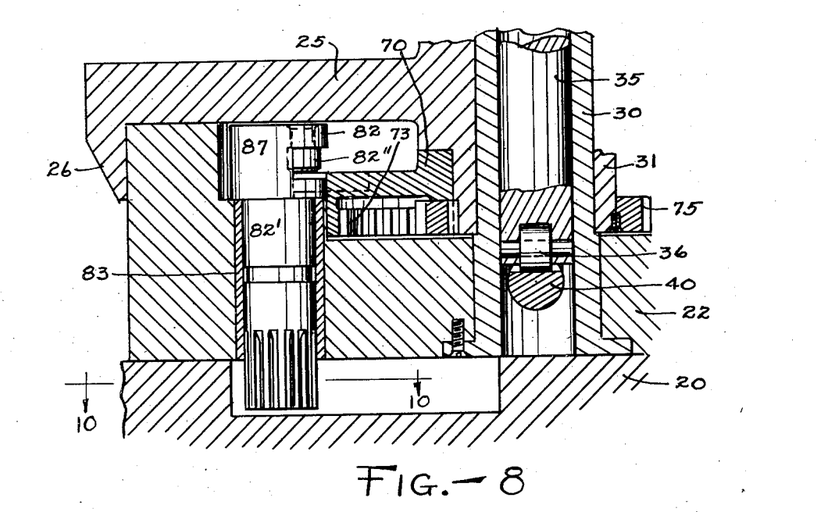
Figs. 8 and 9 are cross sectional views, as indicated by the line 8—8 on Fig. 5.
Figure 9:
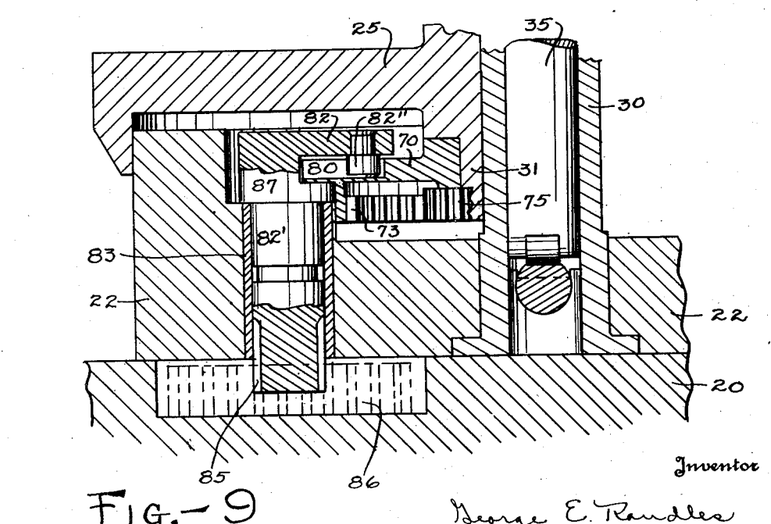
Figure 10:
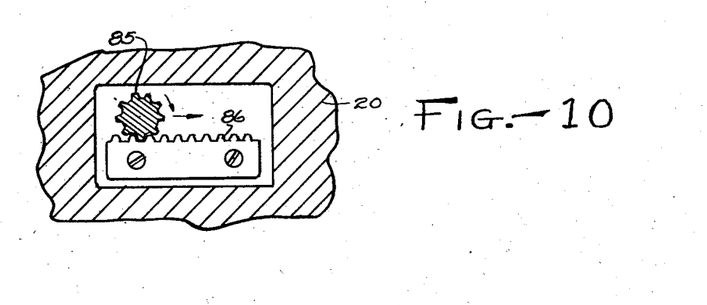
Fig. 10 is a detail view, as indicated by the line 10—10 on Fig. 8.

On the upper surface of the disc 70 are a plurality of radially disposed slots 80 and arcuate recesses 81. The slots are engaged by an oscillatable arm 82 which has a downward extension 82' mounted, as shown in Fig. 8, in a bearing sleeve 83, the sleeve being in turn supported by the carrier 22. The arm carries a downwardly extending pin 82'' which engages a slot of the disc when the table is raised to carry the disc upwardly. The lower end of the extension 82' has teeth formed thereon, as at 85, for engagement with a stationary rack 86, see Figs. 9 and 10, the rack being secured to the base 20 as by screws. The arm 82 has the usual cylindrical portion 87 fitting the recesses 81 in the periphery of the disc 70, but is cut out adjacent the pin 82'' to allow the progressive movement of the disc when engaged by the pin.

To summarize the operation of the above described mechanism, it will be seen that as the bar 50 is carried forwardly or to the left, as in Fig. 1, it first actuates the toggles, causing the carrier and the table to be projected forwardly. Thereafter the cam 57 moves the bar 40 to the right, thus raising the table to the position indicated by broken lines in Fig. 1 at 25a, and causing the precisioning plugs to be released and the indexing mechanism thrown into engagement. Continued movement of the bar moves the table forwardly and through the rack and pinion connection 85 and 86, causes an oscillation of the arm 82 which rotationally advances the disc 70 and the table. As the carrier approaches the end of its forward movement, the cam 68, through the cam bar 40 and bar 35, lowers the table, thus disengaging the disc from the pin 82'' of the oscillating arm. On the return movement of the table and carrier to the full line position, as shown in Fig. 1, the rack 86 turns the arm 82 backwardly to reposition the pin 82'' for reengagement with a new slot 80 of the disc on the next reciprocation of the carrier.

From the foregoing description of the sequence of the operation of the mechanism, it will be seen that the initial movement of the work table is away from the path of the tool, and that the work table is moved away from the path of the tool before any rotation takes place. This horizontal movement of the work table is of extreme importance in connection with certain types of drilling operations. For example, in drilling holes at the bottom of deep slots in a drum, it is possible to withdraw the work from the path of the tool and then turn it, without lifting the tool completely out of the slots. Thus, the necessity for long, vertical travel of the tool is eliminated and the speed of operation is greatly increased.

Furthermore, the indexing mechanism is extremely useful in connection with surface broaching machines, wherein the work is indexed after each stroke of the tool. In these machines it is absolutely necessary to remove the work from the path of the broach before indexing, in order that it will not interfere with the return stroke of the broach.

Figure 11:
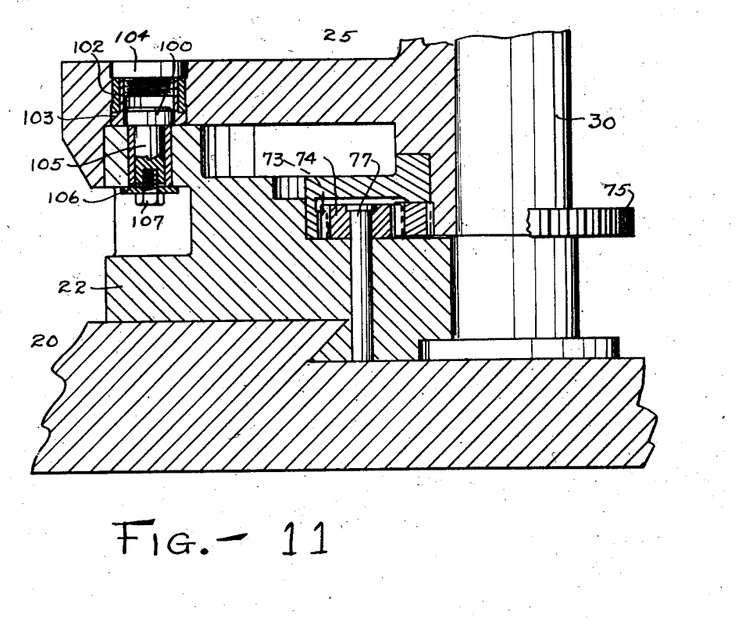
Fig. 11 is a radial cross sectional view of part of the table, as indicated by the line 11—11 on Fig. 6.

In order to accurately locate the work with respect to the tool, after the indexing operation, I employ a set of positioning devices such as shown in Fig. 11 between the carrier and table. These comprise male positioning blocks 100 arranged to coact with sleeves, such as 101. The sleeves, as shown, comprise an outer shouldered ring 102 surrounding an inner ring 103 shouldered against the ring 102 from below, and threaded to receive a member 104 in the nature of a cap screw. The screw holds all the parts securely in place on the table. The male positioning members may have enlarged heads precisely fitting the member 103 and shanks 105 suitably clamped in place as by a plate 106 and cap screw 107.

Figure 5:
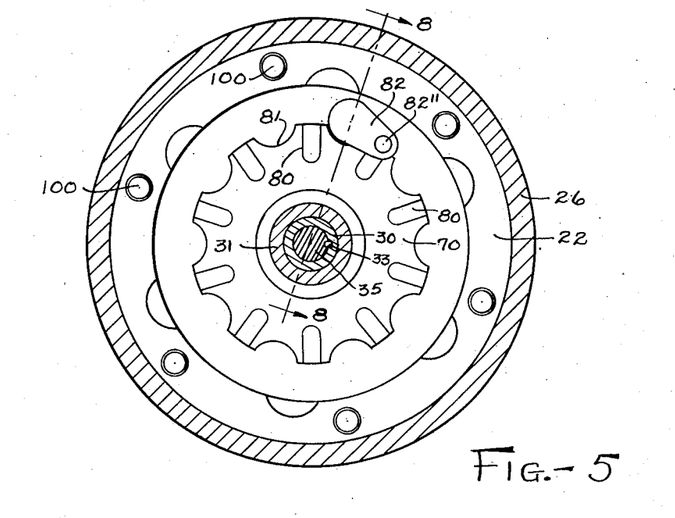
Figs. 5, 6 and 7 are cross sectional plan views, as indicated by respective lines on Fig. 4.
Figure 6:
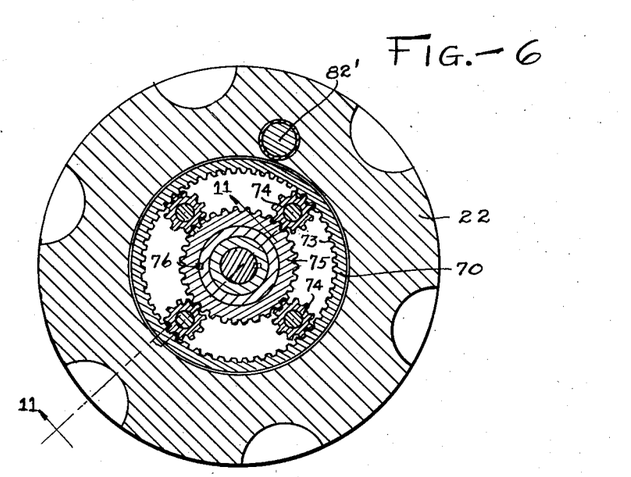

It is to be noted that in Fig. 5, there are six of the positioning devices 100 shown, and ten slots 80 in the Geneva motion disc. Obviously, therefore, carrying a single slot from one position to another, by reason of the arm 82 passing from a position shown to a position in the embrace of the slot next to the one engaged, would not accomplish a 60° turn of the table. However, by reason of the gearing, which is in the ratio of 10 to 6, the external gear 75 will be rotated more rapidly, thereby turning the table its full 60°.

I claim:

1. Indexing mechanism of the kind described, comprising, a rotary element to be indexed, a support therefor, said element being movable transversely of as well as along its axis relative to the support, and means interposed between the element and support for causing an indexing movement of the element consequent upon the transverse movement, there being locking means for holding the rotary element in indexed position, said means being affected to release the element consequent upon said movement of the element along its axis.

2. Indexing mechanism, comprising, a rotary work holder to be indexed, a support therefor, said holder being movable transversely of as well as along its axis relative to the support, locking means for the holder arranged to be released by such movement of said holder along its axis, and reciprocating means intermittently connected to said holder and interposed between the holder and support for causing an indexing movement of the holder consequent upon the aforesaid movements.

3. Indexing mechanism comprising, a rotary element, a relatively stationary support, means to successively cause the element to be periodically moved across the support and raised relative thereto, means to lock the element against turning, the latter means being actuated to release the element when the element is raised, and means operating in consequence of such movements to index the element a predetermined portion of a rotation.

4. Indexing mechanism comprising, a rotary element, a relatively stationary support, releasable locking means for the element, means to intermittently cause the element to be raised relative to the base to release the locking means, means to move the element across the support, and means operating in consequence of such latter movement to rotate the element a predetermined degree.

5. In an indexing mechanism, an element to be indexed, a support therefor, locking means between the element and support, means to intermittently index the element, means to cause movement of the element across the support to operate the indexing means, and means to cause relative movement between the element and support along the axis of the element to release and reposition the locking means.

6. Indexing mechanism of the class described comprising, a rotary element to be indexed, a support therefor, a carrier for the element slidable on said support, means for sliding said carrier or said support, mechanism interposed between the element and the support for causing the element to be indexed consequent upon such sliding movement of the carrier, said mechanism including an interruptable connection between the support and the element, the disconnection being caused by a movement of the element along the axis thereof.

7. Indexing mechanism comprising, a rotary member to be indexed, a support, means for moving the rotary member transversely on the support, a rack on the support, a pinion engaging the rack and movable transversely with the rotary member, whereby the transverse movement of the rotary member results in rotation of the pinion and an arm driven by the pinion, there being a radially slotted member drivingly connected with the rotary member and disposed coaxially therewith, the slots adapted to be engaged by said arm, said rotary member being raisable with reference to the support to connect the arm to the slotted member.

8. In an indexing mechanism, a rotary element to be indexed, a reciprocating carrier therefor, said rotary element being mounted on the carrier and adapted to be raised and lowered relative thereto, a fixed rack, a pinion on the carrier meshing therewith, means reciprocated by the pinion, and means connecting the reciprocating means with the rotary element to cause the same to advance a given degree on each reciprocation of the carrier, there being means to effect such vertical movement of the rotary element to periodically connect and disconnect said first named means and the second named means.

9. Indexing mechanism of the kind described, comprising a rotary element to be indexed, a relatively fixed support and a slidable carrier mounted on the support, said element being mounted for vertical movement on the carrier, a rack on the support, a rotary disc drivingly connected with the rotary element, a pinion rotatably mounted in the carrier and in mesh with the rack and having an arm rigid therewith for cooperation with the disc, the arm being arranged to engage the disc on such raising movement of the rotary element, and means for effecting such raising movement in timed relation to the sliding movement of the carrier.

10. An indexing mechanism comprising a support, a carrier mounted thereon, a tongue and groove connection between the carrier and support, a rotary element to be indexed mounted on said carrier, a cam bar mounted on the carrier and connections therefrom to raise and lower the rotary element, a rotary driver for said element, and reciprocating means actuated by movement of the carrier at such tongue and groove connection for advancing the rotary driver, said reciprocating means being connectable to and disconnectable from the driver consequent upon such vertical movement of the said element, and a common means to shift the cam bar and move the carrier.

11. Indexing mechanism, comprising a rotary work holder to be indexed, a support therefor, means for moving said holder transversely of its axis, means actuated by said transverse movement for moving the holder along its axis, locking means for the holder arranged to be released by such movement of the holder along its axis, and means for causing an indexing movement of the holder after said locking means has been released.

12. Indexing mechanism, comprising the rotary work holder to be indexed, means for locking said work holder against angular movement, means for moving said work holder transversely of its axis, and means for moving said work holder along its axis after part of such transverse movement has taken place, said locking means being released upon movement of the work holder along its axis.

13. In combination, a metal cutting tool, a rotatable work holder adapted to successively present pieces of work to the path of said tool, means for locking said work holder against rotational movement, means for moving said work holder transversely of its axis and away from the path of the tool, means for moving said work holder along its axis after part of said transverse movement has taken place whereby said locking means is released, and means actuated by continued transverse movement of the work holder for rotating it about its axis.

In testimony whereof, I hereunto affix my signature.

GEORGE E. RANDLES.